Sept. 14, 1954  J. P. MAGOS ET AL  2,689,145
STUFFING BOX CONSTRUCTION
Filed Oct. 22, 1949
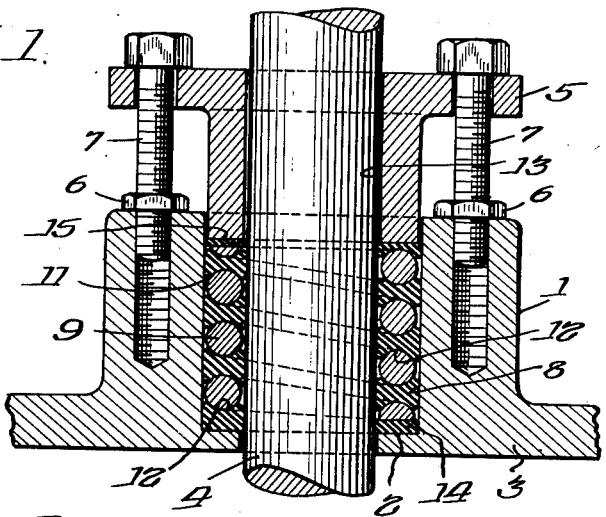
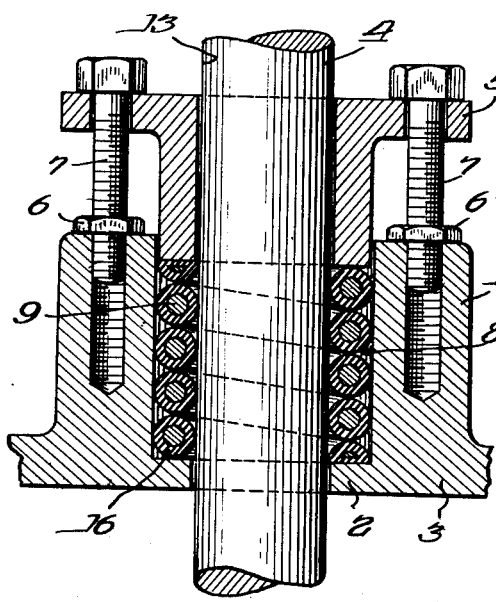
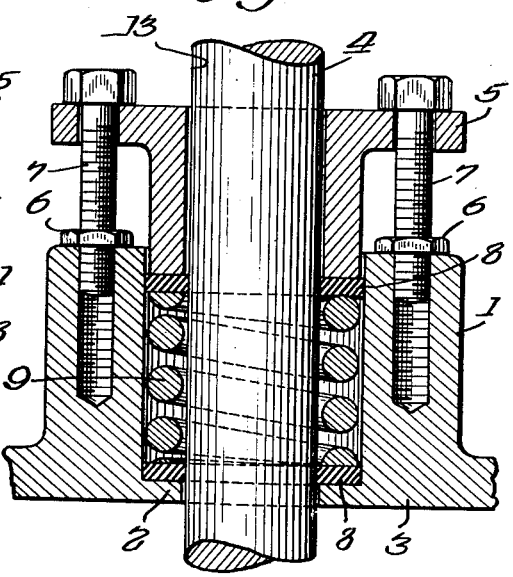
Inventors.
John P. Magos, &
George E. Hansen.
By Joseph O. Lange
Atty.

Patented Sept. 14, 1954

2,689,145

UNITED STATES PATENT OFFICE 2,689,145

STUFFING BOX CONSTRUCTION

John P. Magos, Wilmette, and George E. Hansen, Chicago, Ill., assignors to Crane Co., Chicago, Ill., a corporation Application October 22, 1949, Serial No. 122,872

1 Claim. (Cl. 286—33)

This invention relates to a stuffing box construction. More particularly, it is concerned with a novel structure which consists essentially of a coil spring positioned in a stuffing box or packing chamber, having between the coils a spiral form of packing, whereby the interposed packing is compressed by the spring. Separate or individual rings of packing may also be connected between each coil of the spring, or resilient material may be provided for enclosing the coils of the latter member as hereinafter described in greater detail.

At the outset, in order to obtain a better understanding of this invention, it should be realized that heretofore one of the objections to the use of the usual stuffing box with the superposed layers of packing has been traceable to the fact that the packing under the compression load of the packing gland was not progressively compressed. More specifically, the packing at the top of the stuffing box was found to be under extremely high compression loads, while the packing at the middle and lowermost annular portions of the stuffing box received little or no compression due to the high degree of annular surface friction encountered at the upper portion of the packing box when the packing was compressed.

Therefore, it is one of the more important objects of this invention to provide a construction in which the packing is progressively compressed after the usual adjustment or tightening of the gland bolts or the threaded stuffing nut, and thereby result in the advantage of effecting a lower coefficient of friction on the stem.

Another advantage of this invention lies in the fact that the packing may be easily renewed by spring removal or replacement and is capable of embodiment in a simple and economical structure by merely substituting a string or long and preferably continuous cord of packing between the coils of the spring to receive the desired compression from the latter under the influence of the usual gland.

Other objects and advantages will become more readily apparent upon proceeding with the specification, read in light of the accompanying drawings, in which Fig. 1 is a fragmentary sectional view of a preferred form of the invention.

Figs. 2 and 3 are modified forms.

Similar reference numerals refer to similar parts throughout the several views.

Referring to Fig. 1, a conventional stuffing box suitable for a valve or the like is shown, as at 1, having the inner shouldered portion or ledge 2 within a body member 3. The depth of the stuffing box thus provided is variable, and depends upon the service for which it is ultimately intended to be used. A stem shaft 4 extends through the stuffing box and also relatively snugly fitted to project through the flanged gland member 5, which is held in conventional adjustable position by means of the nut and bolt arrangement 6 and 7, respectively.

The relatively soft and flexible packing 8 is wound between the spirally extending coils of the spring 9. Thus, there will be alternately a packing coil 8 and a spring coil 9. Preferably, although not necessarily, the packing 8 on its inner and outer peripheries may be enlarged, as at 11, and thus in cross-section made dished or of concave form, as at 12, so as to receive and guide the spring coil. It will be apparent that such structure allows for suitable compression centrally and expansion both inwardly and outwardly of the packing 8 respectively against the annular surfaces 13 of the shaft and the interior of the stuffing box 1. If desired, the packing at the lower end portion may be flattened, as at 14, and also formed similarly at the upper end 15 thereof, where it contacts respectively the lower stuffing box and the lower surface portion of the gland. It has been found preferable under the most desirable circumstances that the diameter of the coil stock of the spring 9 should be somewhat less than the annular space between the outside diameter of the shaft and the inside diameter of the stuffing box, thereby to avoid frictional binding.

It will, of course, also be further appreciated that the coil spring 9 serves as a spacer member between the coils of the packing 8, whereby lubrication may be applied to the shaft and the stuffing box when desired, not only to seal the latter in helping to provide against the escape of fluids past the shaft 4. Thus, the latter provision also increases the ease with which the shaft may be moved, either reciprocably or rotatably, or both, as the case may be, and avoids objectionable sticking or binding.

Obviously, the shape of the spring or packing cross-section, or both, may be varied with the dictates of service requirements.

For example, it has been determined that instead of the cross-section of the coil springs being of circular form, as illustrated, they may be made polygonal, whereby to improve the wedging action upon the spirally extending packing interposed between the coils of the spring.

In some cases, a triangular or square form of spring coil or packing construction has been found beneficial. Thus, it should be apparent that the cross-sectional configuration of the stock or material forming the coil spring especially may be freely varied in accordance with the installation requirements, which the packing is to meet.

The matter of the relationship of the packing to the spring may take many forms. For example, in some cases, it has been found desirable to enclose or to coat the coil spring 9, as shown in Fig. 2, with a packing material 16 of substantially the same form as the spring, thus making the spring and the packing an assembly in which the spring is molded within the packing. As the spring is compressed by the gland 5, the packing around each coil will be similarly compressed to bear against the periphery of the shaft and the inner peripheral surface of the stuffing box. The advantages thus lie in that the lowermost coil of the spring at the bottom of the stuffing box will progressively compress the packing 16 by tightening the gland bolt. Thus, each coil comes into effect as a packing member and a peripheral seal accomplished on the soft surfaces on both the inner and outer surfaces of the stuffing box and shaft, respectively. Because of the resiliency of the spring, such compression is more easily accomplished and frequent adjustability is not necessary.

A still further modified form is shown in Fig. 3, in which a conventional coil spring is used, as at 9. However, instead of having the packing follow each spring coil spirally as in the previously described figures, a flat ring or washer as a packing member is provided, of slightly larger cross-sectional dimensions than the coil is applied at top and bottom of the stuffing box. The gland functions in the usual manner to compress the spring 9 and packing 8. In this modification, it will be apparent that by the gland 5, the compression of the spring 9 may be nicely adjusted to effect the desired compression of the packing washer 8 and the flattening of the latter packing member will increase the efficiency of the seal.

The material constituting the packing in all cases will depend on field conditions encountered.

It will, of course, be apparent that the particular forms exemplifying the invention may vary substantially from that shown in the above disclosures, and, therefore, the scope of the invention should be measured by the appended claim.

We claim:

In a stuffing box construction, the combination of a stuffing box, a shaft extending through the stuffing box, coiled packing positioned relatively snugly within the stuffing box, coiled resilient means cooperating with the packing and alternately positioned relative to the said coiled packing to exert compression on upper and lower surfaces of the coils of the packing when subjected to end applied force; the said packing having enlarged inner and outer peripheral portions having flattened annular surfaces for effecting sealing contact, respectively with the annular surfaces of the shaft and stuffing box, the enlarged portions providing centrally disposed recesses on the upper and lower surfaces of the said packing, and the coils of the said resilient means being positioned within the said centrally disposed recesses.

References Cited in the file of this patent

UNITED STATES PATENTS

| Number | Name | Date |
| --- | --- | --- |
| 207,871 | Horton et al. | Sept. 10, 1878 |
| 503,723 | Longstreth | Aug. 22, 1893 |
| 778,635 | Cook | Dec. 27, 1904 |
| 1,019,607 | Danver | Mar. 5, 1912 |
| 1,307,901 | Farland et al. | June 24, 1919 |
| 2,145,598 | Hait | Jan. 31, 1939 |